(12) United States Patent
Hansen

(10) Patent No.: US 6,840,734 B2
(45) Date of Patent: Jan. 11, 2005

(54) METHOD OF OPERATING A TURBINE

(75) Inventor: Lars Henrik Hansen, Roskilde (DK)

(73) Assignee: Forskningscenter Riso, Roskilde (DK)

(*) Notice: Subject to any disclaimer, the term of this patent is extended or adjusted under 35 U.S.C. 154(b) by 0 days.

(21) Appl. No.: 10/204,854

(22) PCT Filed: Mar. 8, 2001

(86) PCT No.: PCT/DK01/00153

§ 371 (c)(1),
(2), (4) Date: Nov. 4, 2002

(87) PCT Pub. No.: WO01/66940

PCT Pub. Date: Sep. 13, 2001

(65) Prior Publication Data

US 2003/0185665 A1 Oct. 2, 2003

(30) Foreign Application Priority Data

Mar. 8, 2000 (DK) ........................................ 2000 00377

(51) Int. Cl.⁷ ............................................. F01B 25/26
(52) U.S. Cl. ....................................................... 415/1
(58) Field of Search .......................... 415/1, 30; 416/1, 416/35, 43, 44, 61

(56) References Cited

U.S. PATENT DOCUMENTS

| | | | | |
|---|---|---|---|---|
| 4,150,301 A | * | 4/1979 | Bergey, Jr. ..................... | 416/41 |
| 4,193,005 A | * | 3/1980 | Kos et al. ...................... | 416/43 |
| 4,329,117 A | * | 5/1982 | Doman .......................... | 416/41 |
| 4,426,192 A | * | 1/1984 | Chertok et al. ................. | 416/1 |
| 4,427,897 A | | 1/1984 | Migliori | |
| 4,584,486 A | * | 4/1986 | Quynn .......................... | 416/44 |
| 4,700,081 A | * | 10/1987 | Kos et al. ...................... | 290/44 |
| 5,155,375 A | | 10/1992 | Holley | |

FOREIGN PATENT DOCUMENTS

| | | |
|---|---|---|
| DE | 19532409 | 3/1997 |
| DE | 19636591 | 3/1998 |
| GB | 2206930 | 1/1989 |

OTHER PUBLICATIONS

M. Ermis, H.B. Ertan, E. Akpinar, and F. Ülgüt; "Autonomous Wind Energy Conversion System With a Simple Controller For Maximum–Power Transfer"; IEE Preceedings–B, pps. 421–428; Sep. 1992.

E. Muljadi, K. Pierce and P. Migliore, "Control Strategy For Variable–Speed Stall–Regulated Wind Turbines"; Proceedings of the American Control Conference; pps. 1710–1714; Jun. 1998.

* cited by examiner

Primary Examiner—Edward K. Look
Assistant Examiner—Igor Kershteyn
(74) Attorney, Agent, or Firm—Harness, Dickey & Pierce, P.L.C.

(57) ABSTRACT

A method of controlling the speed of rotation of a turbine, the turbine comprising a rotor, the method comprising the steps of measuring or estimating power or torque related to the energy production of the turbine, processing the measured or estimated power or torque so as to obtain a corresponding rotational speed, comparing the obtained rotational speed to a first predefined threshold value and to a second predefined threshold value, the second predefined threshold value being larger than the first predefined threshold value, and controlling the speed of rotation of the rotor according to the obtained rotational speed, so as to obtain a predetermined energy production from the turbine, and in such a way that in case the obtained rotational speed does not exceed the first predefined threshold value, the predetermined energy production from the turbine is optimal, in case the obtained rotational speed exceeds the first predefined threshold value, but does not exceed the second predefined threshold value, the predetermined energy production from the turbine is optimal, in case the obtained rotational speed exceeds the second predefined threshold value, the speed of rotation of the rotor of the turbine is reduced in a predefined manner to a value corresponding to the first predefined threshold value.

30 Claims, 8 Drawing Sheets

Prior art

METHOD OF OPERATING A TURBINE

BACKGROUND OF THE INVENTION

The present invention relates to a method of controlling the speed of rotation of a turbine, in particular a wind turbine, in such a way that a higher energy production at a wide range of wind speeds, in particular at low wind speeds, is obtained, as well as an improved quality of the produced electricity, and at the same time reducing the structural loads on the turbine. Further, a turbine being operated according to the method according to the present invention is easier to control than existing turbines. A method according to the invention is particularly useful when operating wind turbines, such as stall controlled wind turbines.

The present invention further relates to a turbine, in particular a wind turbine, the turbine being capable of being operated according to the method according to the invention.

The present invention even further relates to a method of operating a plurality of turbines, in particular wind turbines, e.g. forming a wind farm, such as an offshore wind farm.

It is known to control wind turbines according to a stall control strategy. However, it is desirable to provide a control strategy in which an even higher energy production may be obtained while still maintaining control of the turbine and ensuring that the turbine is not damaged during the normal operation. It is also desirable to provide a control strategy in which the parameters used for controlling the operation of the turbine are readily and easily measured and/or estimated. In normal stall controlled turbines the small power fluctuations are provided. However, this causes the structural loads on the turbine to be large. It is therefore desirable to provide a control strategy in which the structural loads on the turbine are reduced while it is ensured that the power fluctuations remain small.

In "Autonomous wind energy conversion system with a simple controller for maximum-power transfer", IEE Proceedings-B, Vol. 139, No. 5, pages 421–428, Stevenage, Sep. 1992, by M. Ermis et al., there is disclosed a method of controlling a wind turbine. The method optimises the energy output of the turbine for a chosen wind regime while keeping the generator cost at a minimum. This is obtained by choosing the power output as the controlled variable. Thus, a rotational speed is measured and 'processed' in order to obtain a corresponding power value. This step is performed by means of a look-up table.

In "Control Strategy for Variable-Speed, Stall-Regulated Wind Turbines", Proceedings of the 1998 American Control Conference, Vol. 3, 1998, pages 1710–1714, Philadelphia, USA, by E. Muljadi et al., there is disclosed a method of operating a wind turbine in which a torque is measured and processed in order to obtain a speed of rotation. At low wind speeds the wind turbine is operated so that maximum power is produced by operating near $C_{p,max}$. At higher wind speeds the wind turbine is prevented from following the $C_{p,max}$ trajectory and is forced to operate at a lower tip-speed-ratio and $C_p$. It is thus not possible to obtain maximum power output at higher wind speeds.

In GB 2 206 930 A there is disclosed a wind turbine operating system comprising a speed limiting system. When wind speed increase tends to run the turbine above its rated conditions, the brake is applied to slow the turbine to a speed at which the blades are operating so inefficiently that further wind speed increase cannot increase shaft speed or torque unacceptably.

None of the above references discloses a method for controlling a turbine in which an optimal energy production may be obtained at higher wind speeds.

SUMMARY OF THE INVENTION

Thus, it is an object of the present invention to provide a method of operating a turbine in such a way that an energy production is obtained which exceeds the energy production of known turbines while maintaining control of the turbine. It is a further object of the present invention to provide a method of operating a turbine in such a way that, at any wind speed, an optimum amount of energy is produced. It is an even further object of the present invention to provide a method of operating a turbine in such a way that rotational speeds exceeding the nominal rotational speed of the turbine may be used. It is an even further object of the present invention to provide a method of operating a wind turbine in which the parameters used for operation are readily and easily measured and/or estimated. It is an even further object of the invention to provide a method of operating a turbine in such a way that the structural loads on the turbine are reduced while it is ensured that the power fluctuations remain small.

Furthermore, it is an object of the present invention to provide a turbine being adapted to be operated in accordance with the above objects.

Even further, it is an object of the invention to provide a method of operating a plurality of turbines, such as turbines forming a wind farm, in such a way that the energy production of the plurality of turbines is optimised while still maintaining control of the turbines.

Thus, according to the present invention there is provided a method of controlling the speed of rotation of a turbine, the turbine comprising a rotor, the method comprising the steps of measuring or estimating power or torque related to the energy production of the turbine, processing the measured or estimated power or torque so as to obtain a corresponding rotational speed, comparing the obtained rotational speed to a first predefined threshold value and to a second predefined threshold value, the second predefined threshold value being larger than the first predefined threshold value, and controlling the speed of rotation of the rotor according to the obtained rotational speed, so as to obtain a predetermined energy production from the turbine, and in such a way that in case the obtained rotational speed does not exceed the first predefined threshold value, the predetermined energy production from the turbine is optimal, in case the obtained rotational speed exceeds the first predefined threshold value, but does not exceed the second predefined threshold value, the predetermined energy production from the turbine is optimal, in case the obtained rotational speed exceeds the second predefined threshold value, the speed of rotation of the rotor of the turbine is reduced in a predefined manner to a value corresponding to the first predefined threshold value.

The power related to the energy production is preferably the electrical power generated by the generator, but may also be e.g. the mechanical power available at the rotor shaft. The power is preferably measured, but it may alternatively be estimated, e.g. based on earlier measurements obtained from the turbine in question and/or one or more similar turbines, and/or based on theoretical calculations. The torque related to the energy production is preferably the torque on the rotor.

The measured or estimated power or torque is preferably electronically processed. But it may alternatively or additionally be e.g. mechanically and/or electrically processed.

The corresponding rotational speed is preferably a theoretical value of the rotational speed of the rotor, corresponding to the measured or estimated power of the generator or to the measured or estimated torque. It is preferably a desired value of the speed of rotation of the rotor, said desired value preferably giving the optimum energy production under the given circumstances (such as e.g. wind speed, nominal rotational speed etc.). It may also be another desired value, such as a maximum value of the speed of rotation of the rotor. It may, however, alternatively or additionally be any other suitable rotational speed, such as e.g. the speed of rotation of the generator.

By choosing the "right" speed of rotation the structural loads on the turbine are reduced.

The control of the speed of rotation of the rotor may be performed electronically, such as by sending a suitable output to the generator of the turbine. In case the obtained rotational speed indicates a desired value of the speed of rotation of the rotor, the speed of rotation of the rotor is preferably controlled so as to be equal to said desired obtained value. However, in case the obtained value is above a certain level, where operation of the rotor at rotational speeds above said level may cause damage to the turbine, the rotational speed of the rotor may be controlled so as to not exceed said level.

The speed of rotation of the rotor is controlled in such a way that (in case the turbine is a wind turbine) at low or moderate wind speeds, the turbine is operated at or near the $C_{p,max}$ trajectory in order to obtain an optimal energy production. This is not uncommon. However, as the wind speed increases, and the speed of rotation of the rotor exceeds the nominal speed, $n_0$, a turbine being operated according to the present invention may still be operated at or near the $C_{p,max}$ trajectory, at least to a certain extend. However, it must of course be ensured that the limits of the turbine are not exceeded, i.e. the turbine may under no circumstances be operated in such a way that structural damages occur, etc. Therefore, in case the turbine approaches such a limit, the speed of rotation should be reduced in a controlled manner so as to avoid such damages. In the case described here, the 'first predefined value' to which the obtained rotational speed is compared, is the nominal speed, $n_0$, and the 'second predefined value' is an upper limit of the rotor of the turbine.

Alternatively, the 'second predefined value' may be a chosen value being smaller than the nominal generator power. The value may be chosen in accordance with specifications set by a recipient, such as a power plant. This will be further described below.

The first and second predefined values are preferably fixed for a certain turbine. However, they may also be dynamic, so that they may be altered, e.g. according to the present requirements of a power grid, weather conditions, etc.

The control may alternatively or additionally be performed in any other suitable way, such as in a mechanical or electrical way.

The predetermined energy production is preferably chosen in such a way that the energy production is as high as possible. However, it may alternatively or additionally be chosen from other criteria, such as a wish from the power station or public utility which receives the produced energy to limit the production to a certain level and/or a limit ensuring that no damage is caused to the turbine.

The predetermined energy production may be determined in advance, such as "once and for all", but it may alternatively or additionally be continuously determined, e.g. by using look-up tables and/or by means of on-line calculations.

The method according to the invention may thus be used to control the energy production so that as much energy as possible is produced and/or so that a desired amount of energy is produced, where said desired energy production is below the maximum energy production under the given circumstances.

The comparing step may be performed, e.g. by means of a look-up table, e.g. using a computer.

It is a great advantage of the method according to the present invention that it is unnecessary to measure the wind speed, since it is very difficult to obtain a precise measurement of the wind speed. A measurement of power or torque related to the energy production of the turbine, on the other hand, is readily and easily obtained, and is thereby a good and precise parameter for controlling the turbine.

In a very preferred embodiment of the invention the turbine is a wind turbine. It may, however, alternatively be e.g. a water turbine, a circulation pump, a fan or any other suitable kind of turbine.

Preferably, the processing step is performed electronically. But it may alternatively or additionally be performed mechanically and/or electrically as described above.

Most preferably, in case the predetermined energy production from the turbine is optimal, the turbine is operated in such a way that the instantaneous $C_p$ for the turbine is as close as possible or equal to the maximum $C_p$. Thereby an optimal energy production is ensured. However, the predetermined energy production may alternatively or additionally be chosen in order to prevent damage to the turbine and/or in order to meet a wish from the power station to limit the production as described above.

The processing may be based on a predetermined set of data being values of pre-selected $C_p$'s and corresponding rotational speeds. The predetermined set of data may be empirically obtained by way of measurement and/or it may be calculated based on theoretical values. It may be obtained initially, i.e. before the operation of the turbine is initiated and/or it may be continuously obtained, e.g. by an on-line determination/calculation.

The pre-selected $C_p$'s are preferably the maximum $C_p$'s obtained during stationary rational conditions of the wind turbine at varying wind speeds. It may, however, be obtained on a purely theoretical basis as described above.

The method may further comprise the step of initially determining curves of mechanical power and/or $C_p$ for the turbine rotor at different rotational speeds. The determination is in this case preferably performed before the operation of the turbine is initiated. It may be obtained by means of measurements and/or by means of theoretical calculations as described above.

In case the method further comprises the step of initially determining curves of mechanical power and/or $C_p$ for the turbine rotor at different rotational speeds, the step of processing the measured or estimated power or torque may include the steps of for each rotational speed determining the wind speed which gives $C_{p,max}$, and determining the mechanical and/or electrical power corresponding to said wind speed.

This step may include using predefined data, such as look-up tables or curves. It may additionally or alternatively include continuous determining of the wind speed and/or the power, e.g. by on-line calculations as described above.

In case the method further comprises the step of initially determining curves of mechanical power and/or $C_p$ for the turbine rotor at different rotational speeds the step of processing the measured or estimated power or torque may alternatively include the steps of subsequently determining curves of mechanical power and/or $C_p$ for the turbine rotor at different rotational speeds, for each rotational speed determining the wind speed which gives $C_{p,max}$, and determining the mechanical and/or electrical power corresponding to said wind speed.

In this case the subsequently determined curves are determined each time the step of processing is performed. Most preferably this is performed continuously, but it may alternatively be based on data, e.g. in the form of look-up tables and/or curves, the data being empirically and/or purely theoretically obtained and being available before the operation of the turbine is initiated.

Thus, the wind speeds giving $C_{p,max}$ for each rotational speed may be predetermined from pre-recorded or theoretical data.

The first predefined threshold value may correspond to a nominal or a pseudo-nominal rotational speed of the rotor of the turbine, and the second predefined threshold value may correspond to an upper limit of the rotor of the turbine. The case where the 'first predefined threshold value' corresponds to a nominal rotational speed of the rotor of the turbine has already been described above. In this case the 'first predefined threshold value' is defined by the generator of the turbine.

The term 'pseudo-nominal rotational speed' should be interpreted as a 'nominal speed' which is chosen and which results in a power output which is smaller than the nominal generator power. In this case a controllable power output may be provided from the turbine. Thus, it may, e.g., be chosen to obtain a 300 kW power output from a 500 kW turbine, i.e. the 500 kW turbine will act as if it was a 300 kW turbine. This provides rich possibilities for controlling the power output from the turbine, e.g. according to the present need, specifications from, e.g., a power plant, etc.

In one embodiment the speed of rotation of the rotor of the turbine, in case the obtained rotational speed exceeds the second predefined threshold value, may be reduced by:

maintaining the speed of rotation on a value corresponding to the second predefined threshold value, while the energy production of the turbine increases until it reaches an energy threshold value, and subsequently reducing the speed of rotation to a value corresponding to the first predefined threshold value in case the energy production continues to increase.

Figure 7A:
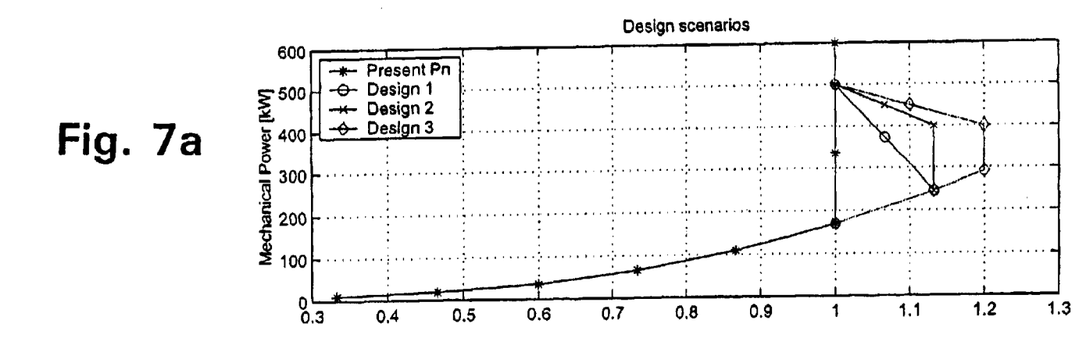
FIG. 7a shows the mechanical power of a wind turbine as a function of the rotational speed of the rotor for different designs.

In this embodiment the energy production of the turbine is kept optimal as long as possible. In FIG. 7a, the curve corresponding to 'Design 2' illustrates this situation. Of course, it must still be ensured that the upper limit of the rotor of the turbine is not exceeded.

In another embodiment, the speed of rotation of the rotor of the turbine, in case the obtained rotational speed exceeds the second predefined threshold value, may be reduced by:

reducing the speed of rotation linearly with respect to the energy production of the turbine until a predefined energy production as well as the speed of rotation corresponding to the first predefined threshold value is obtained.

The term 'linearly with respect to the energy production of the turbine' should be understood as forming an at least substantially linear relation between the energy production and the rotational speed of the rotor of the turbine. In FIG. 7a, the curve corresponding to 'Design 1' illustrates this situation. The purpose is to get from the point at the $C_{p,max}$ trajectory where the obtained rotational speed exceeds the second predefined threshold value (in case of FIG. 7a and 'Design 1' the point just above 1.1) to the point representing a predefined energy production (in this case 500 kW) as well as the 'first predefined threshold value' (in this case the nominal speed) as easily as possible. In this case the two points, represented in a co-ordinate system of rotational speed and energy production, are connected by an at least substantially straight line.

Alternatively, the two points may be connected in any other suitable way, as long as it is ensured that the electrical torque remains larger than the mechanical torque in order to avoid runaway of the rotational speed of the rotor of the turbine.

In a very preferred embodiment the method further comprises the step of measuring the speed of rotation of the rotor.

In this embodiment the method may further comprise the steps of comparing the measured speed of rotation of the rotor and the rotational speed obtained by processing the measured or estimated power or torque, producing a signal being significant for said comparison, and controlling the speed of rotation of the rotor according to said signal.

Preferably, the measured speed of rotation as well as the obtained value are used as inputs to a PI (proportional integrator) controller. The PI controller in turn sends a signal to a converter, which sends a signal to the generator of the turbine in order to control the speed of rotation of the rotor. The speed of rotation is preferably controlled in such a way that it becomes equal to the obtained value. However, this may be done in due consideration to the fact that no damage should be caused to the turbine. The PI controller may be integrated in the converter. Alternatively, other controllers, such as e.g. a PID (proportional integrator differential) controller may be used.

The produced signal preferably indicates the difference between the measured speed of rotation and the rotational speed obtained by processing the measured or estimated power or torque. In this case the speed of rotation of the rotor may preferably be adjusted up or down according to the sign of the difference signal. There may be a threshold value, so that the speed of rotation is only adjusted if the numerical value of the difference signal exceeds this threshold value, thus avoiding small adjustments. Or the adjustment may only be performed if the sign of the difference signal is constant over a certain period of time.

Alternatively, a speed of rotation may be estimated by e.g. the converter, and the estimated value may be used instead of the measured value as described above.

In case the turbine is a wind turbine, the method may further comprise the step of adjusting the power generated by the turbine by adjusting the pitch angle of the turbine.

Thus, the produced power may be limited, e.g. in case a smaller power than the nominal generator power is required as described above. A smaller safety margin is required as compared to turbines being controlled in a conventional way, i.e. a larger power may be obtained since a higher rotational speed of the rotor can be obtained without risking runaway of the rotor of the turbine. Normally, it is very difficult to provide such a control in stall controlled turbines. Referring to FIG. 6c, the point c is dragged even further away from the curve, i.e. the angle at the point c is made even more acute, thereby providing a larger output power at the wind speed corresponding to the point c.

The present invention further provides a turbine comprising a rotor, a generator, means for measuring or estimating power or torque related to the energy production of the turbine, processing means for processing the power or torque measured or estimated by the measuring or estimating means, so as to obtain a corresponding rotational speed, comparing means for comparing the obtained rotational speed to a first predefined threshold value and to a second predefined threshold value, the second predefined threshold value being larger than the first predefined threshold value, and control means for controlling the speed of rotation of the rotor according to the obtained rotational speed, the control means being adapted to control the speed of rotation in such a way that a predetermined energy production is obtained from the turbine, and in such a way that in case the obtained rotational speed does not exceed the first predefined threshold value, the predetermined energy production from the turbine is optimal, in case the obtained rotational speed exceeds the first predefined threshold value, but does not exceed the second predefined threshold value, the predetermined energy production from the turbine is optimal, in case the obtained rotational speed exceeds the second predefined threshold value, the speed of rotation of the rotor of the turbine is reduced in a predefined manner to a value corresponding to the first predefined threshold value.

The means for measuring or estimating power or torque preferably comprises electronically measuring means, but it may alternatively or additionally comprise look-up tables and/or curves containing data obtained by previous measurements and/or theoretical calculations.

The processing means is preferably electronically processing means, but it may alternatively or additionally be electrical and/or mechanical processing means.

The control means is preferably electronically control means, but it may alternatively or additionally comprise electrical and/or mechanical control means. Most preferably, it comprises a PI (proportional integrator) controller and/or a converter. It may alternatively or additionally comprise a PID (proportional integrator differential) controller.

The comparing means may comprise computing means, such as a personal computer (PC), and/or it may comprise one or more look-up tables containing the first and second predefined threshold values.

The turbine is most preferably a wind turbine. But it may alternatively be any other suitable kind of turbine, such as e.g. a water turbine.

The processing means is preferably electronically processing means. But it may alternatively or additionally be any other suitable kind of processing means as described above.

The turbine may further comprise means for determining curves of mechanical power and/or $C_p$ for the turbine. The determining means may be of any suitable kind as previously described. It may thus comprise e.g. look-up tables and/or curves being based on previously obtained empirical data and/or theoretical calculations. It may alternatively comprise means for performing an on-line determination of said curves.

In this case the turbine may further comprise means for determining, for each rotational speed, the wind speed which gives $C_{p,max}$, and means for determining the mechanical and/or electrical power corresponding to said wind speed.

The means for determining wind speed may comprise tables containing pre-recorded or theoretical data. The data may be obtained empirically and/or it may be based on theoretical calculations. Alternatively or additionally it may comprise means for performing on-line determination.

The means for determining wind speed may comprise curves of pre-recorded or theoretical data. These curves may be obtained using empirical and/or theoretical data as described above.

The turbine may further comprise means for measuring the speed of rotation of the rotor. This measuring means may comprise a conventional tachometer.

The turbine may further comprise means for comparing the measured speed of rotation and the rotational speed obtained by processing the measured or estimated power or torque.

Alternatively, a speed of rotation may be estimated by e.g. the converter, and the estimated value may be used as an input for the means for comparing the measured speed of rotation and the rotational speed obtained by processing the measured or estimated power or momentum instead of the measured value.

Preferably, the control means comprises means for receiving a signal, said signal being produced by the comparing means, and wherein the control means controls the speed of rotation of the rotor according to said signal. Most preferably, the produced signal indicates the difference between the measured or estimated speed of rotation and the rotational speed obtained by processing. In this case the control means preferably comprises a PI (proportional integrator) controller and/or a converter, and the signal indicating the difference between the two values is used as an input to the PI controller which in turn produces an output which is used as an input to the converter which in turn produces a signal for the generator causing the generator to adjust the speed of rotation of the rotor, e.g. in such a way that the actual speed equals the value obtained by the processing. The PI controller may be integrated into the converter.

In a preferred embodiment the turbine is a gear-less wind turbine. It may, however also be a wind turbine comprising a gear arrangement.

The turbine may further comprise means for, in case the obtained rotational speed exceeds the second predefined threshold value, reducing the speed of rotation of the rotor of the turbine, the reducing means being adapted to maintain the speed of rotation on a value corresponding to the second predefined threshold value, while the energy production of the turbine increases until it reaches an energy threshold value, and subsequently reduce the speed of rotation to a value corresponding to the first predefined threshold value in case the energy production continues to increase.

Alternatively, the turbine may further comprise means for, in case the obtained rotational speed exceeds the second predefined threshold value, reducing the speed of rotation of the rotor of the turbine, the reducing means being adapted to reduce the speed of rotation linearly with respect to the energy production of the turbine until a predefined energy production as well as the speed of rotation corresponding to the first predefined threshold value is obtained.

The present invention further provides a method of operating a plurality of turbines, the method comprising the steps of:

measuring or estimating power or torque related to the energy production of the plurality of turbines, processing the measured or estimated power or torque so as to obtain a corresponding rotational speed, and controlling the speed of rotation of the rotors of all of the plurality of turbines according to the obtained rotational speed, so as to obtain a predetermined energy production from the plurality of turbines.

The speed of rotation of the rotors of the turbines is controlled in such a way that the speed of all the rotors is the same.

The measuring or estimating step as well as the processing step are preferably performed as described above.

The plurality of turbines are thus controlled together and simultaneously in such a way that the total energy production obtained from the turbines corresponds to a predetermined energy production.

In one embodiment all of the plurality of turbines may be connected to a single power converter converting the AC power of the turbines to a DC power which is suitable for being transmitted over long distances. The DC power may then be transmitted to another (distant) power converter converting the DC power to an AC power being suitable for being input to a power system.

Alternatively, each of the plurality of turbines may be provided with a power converter, the turbines then forming a DC grid. In this case it is impossible, or at least inconvenient, to control all of the turbines together. This makes it more complicated to control the plurality of turbines. On the other hand, the possibility of controlling the turbines individually may in some cases be advantageous.

Preferably, the plurality of turbines are wind turbines, and they preferably form a wind farm. The wind farm may be positioned in a remote place, such as a desert or at sea, such as an offshore wind farm.

The method may further comprise the steps of:

comparing the obtained rotational speed to a first predefined threshold value and to a second predefined threshold value, the second predefined threshold value being larger than the first predefined threshold value, and controlling the speed of rotation of the rotors of all of the plurality of turbines according to the obtained rotational speed in such a way that in case the obtained rotational speed does not exceed the first predefined threshold value, the predetermined energy production from the turbines is optimal, in case the obtained rotational speed exceeds the first predefined threshold value, but does not exceed the second predefined threshold value, the predetermined energy production from the turbines is optimal, in case the obtained rotational speed exceeds the second predefined threshold value, the speed of rotation of the rotors of all the turbines is reduced in a predefined manner to a value corresponding to the first predefined threshold value.

This has been described above in case of one turbine. The remarks above are equally applicable here. In particular, the first predefined threshold value may be a nominal or pseudo-nominal rotational speed of the rotors of the turbines, and the second predefined threshold value may be an upper limit of the rotors of the turbines, e.g. a limit above which there is a substantial risk for structural damages being applied to the turbines. In case the first predefined threshold value is a pseudo-nominal rotational speed of the rotors of the turbines, it may be a chosen value, as described above. Thus, the plurality of turbines may be operated so as to act as if the nominal generator power of the turbines is smaller than the actual nominal generator power, as described above. This makes it possible to obtain a controllable power output from the plurality of turbines. This is very desirable since it enables an operator, e.g. a power plant or the operator of a power grid, to request a certain power level, and to obtain the requested power level. The system is thus very flexible and may be adjusted according to various conditions, such as the present need for power, weather conditions, seasons, etc.

In case the obtained rotational speed exceeds the second predefined threshold value, the speed of rotation of the rotors of the turbines may be reduced by:

maintaining the speed of rotation on a value corresponding to the second predefined threshold value, while the energy production of the turbines increases until it reaches an energy threshold value, and subsequently reducing the speed of rotation to a value corresponding to the first predefined threshold value in case the energy production continues to increase.

As described above, this case is illustrated in FIG. 7a, the curve corresponding to 'Design 2'. The remarks set forth in this connection are equally applicable here.

Alternatively, the speed of rotation of the rotors of the turbines may, in case the obtained rotational speed exceeds the second predefined threshold value, be reduced by:

reducing the speed of rotation linearly with respect to the energy production of the turbines until a predefined energy production as well as the speed of rotation corresponding to the first predefined threshold value is obtained.

As described above this is illustrated in FIG. 7a, the curve corresponding to 'Design 1'. The remarks set forth in this connection are equally applicable here.

The processing step may be performed electronically. Alternatively, it may be performed mechanically, manually or in any other suitable way. It may, e.g., be performed using a look-up table, either electronically, such as by means of a computer, such as a personal computer (PC), or manually.

The turbines are preferably operated in such a way that the instantaneous $C_p$ for the turbines is as close as possible or equal to the maximum $C_p$. This is especially applicable for low or moderate wind speeds (in case the turbines are wind turbines). However, as described above, the present invention provides the possibility of operating the turbines in such a way that the instantaneous $C_p$ for the turbines is as close as possible or equal to the maximum $C_p$ at rotational speeds which are above the nominal speed, $n_0$, for the turbines. This is very advantageous, since the energy production from the turbines in this way may be larger than the energy production which would otherwise be obtainable.

The processing may be based on a predetermined set of data being values of pre-selected $C_p$'s and corresponding rotational speeds. Such data may, e.g., be contained in a look-up table which may be used electronically or manually.

The pre-selected $C_p$'s may be the maximum $C_p$'s obtained during stationary rational conditions of the wind turbines at varying wind speeds.

In case the turbines are wind turbines, the method may further comprise the step of initially determining curves of mechanical power and/or $C_p$ for the turbine rotors at different rotational speeds.

The step of processing the measured or estimated power or torque may include the steps of for each rotational speed determining the wind speed which gives $C_{p,max}$, and determining the mechanical and/or electrical power corresponding to said wind speed.

The step of processing the measured or estimated power or torque may include the steps of subsequently determining curves of mechanical power and/or $C_p$ for the turbine rotors at different rotational speeds, for each rotational speed determining the wind speed which gives $C_{p,max}$, and determining the mechanical and/or electrical power corresponding to said wind speed.

The wind speeds giving $C_{p,max}$ for each rotational speed may be predetermined from pre-recorded or theoretical data.

In case the turbines are wind turbines, the method may further comprise the step of individually adjusting the power generated by one or more of the plurality of turbines by adjusting the pitch angle of each of said one or more turbine(s).

Thus, the energy production originating from the individual turbine may be adjusted by means of the pitch angle of the turbine. This is particularly useful in case the turbines form a wind farm and one or more of the turbines are located in a wind shadow originating from one or more of the other turbines. In this case the turbine(s) being located in the wind shadow will experience a lower wind speed than the turbines being located outside such a wind shadow. It may therefore be desirable to adjust the power generated from some of the turbines, e.g. in order to homogenise the power output from the turbines while ensuring that none of the turbines suffer structural damage. Additionally, this makes the system even more flexible.

The invention will now be further described with reference to the accompanying drawings in which:

BRIEF DESCRIPTION OF THE DRAWINGS

Figure 1:
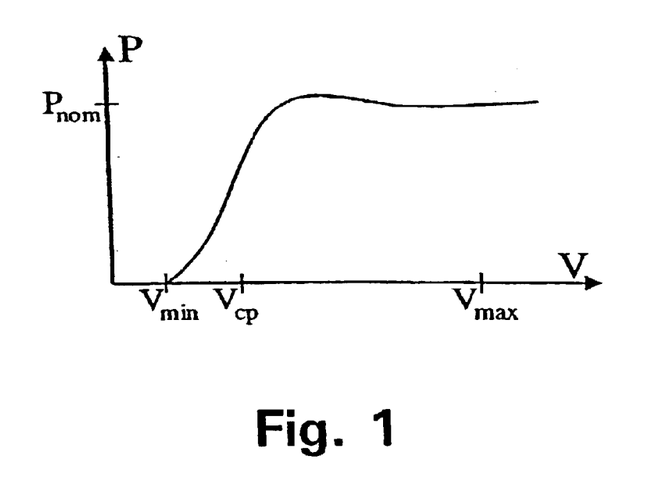
FIG. 1 shows the power of a fixed speed stall controlled wind turbine as a function of the wind speed.

FIG. 1 shows the produced power, P, of a fixed speed stall controlled wind turbine as a function of the wind speed, v.

DETAILED DESCRIPTION OF THE INVENTION

At wind speeds below the minimum wind speed, $v_{min}$, no power is produced—the wind turbine is idle. When the wind speed exceeds $v_{min}$ the turbine starts to operate and thus to produce power. The produced power increases with increasing wind speeds until the wind speed exceeds the optimal wind speed, where the nominal power, $P_{nom}$, of the turbine is reached and the produced power thus no longer increases, but stays substantially constant. At wind speeds exceeding the maximum wind speed, $v_{max}$, the wind turbine is preferably stopped, so as to minimise the risk of damage to the turbine due to the high wind speed.

Figure 2:
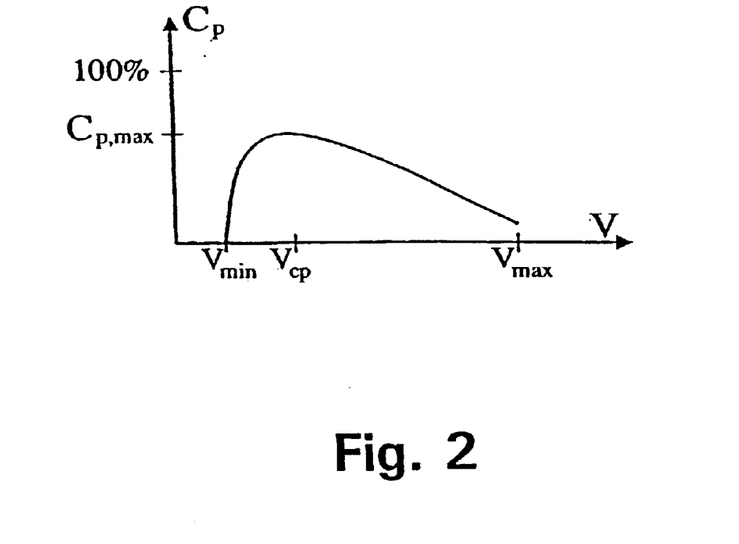
FIG. 2 shows $C_p$ as a function of the wind speed for a fixed speed stall controlled wind turbine at a nominal rotational speed, $n_0$=1500 rpm, equivalent to 50 Hz.

FIG. 2 shows the mechanical efficiency, $C_p$, of a fixed speed stall controlled wind turbine as a function of the wind speed, v, at a nominal rotational speed, $n_0$=1500 rpm, equivalent to 50 Hz. FIG. 2 corresponds to FIG. 1. Thus, since no power is produced at wind speeds below the minimum wind speed $v_{min}$, when the wind turbine is idle, $C_p$ is also zero in this area. $C_p$ increases for increasing wind speeds exceeding $v_{min}$ until the wind speed reaches the optimal wind speed, $v_{cp}$, where the maximum $C_p$, $C_{p,max}$, is reached. At wind speeds exceeding $v_{cp}$ $C_p$ decreases for increasing wind speeds, thus indicating that the ability of the rotor to absorb energy from the wind becomes worse as the wind speed increases. At wind speeds exceeding the maximum wind speed, $v_{max}$, the wind turbine is preferably stopped as described above.

Figure 3:
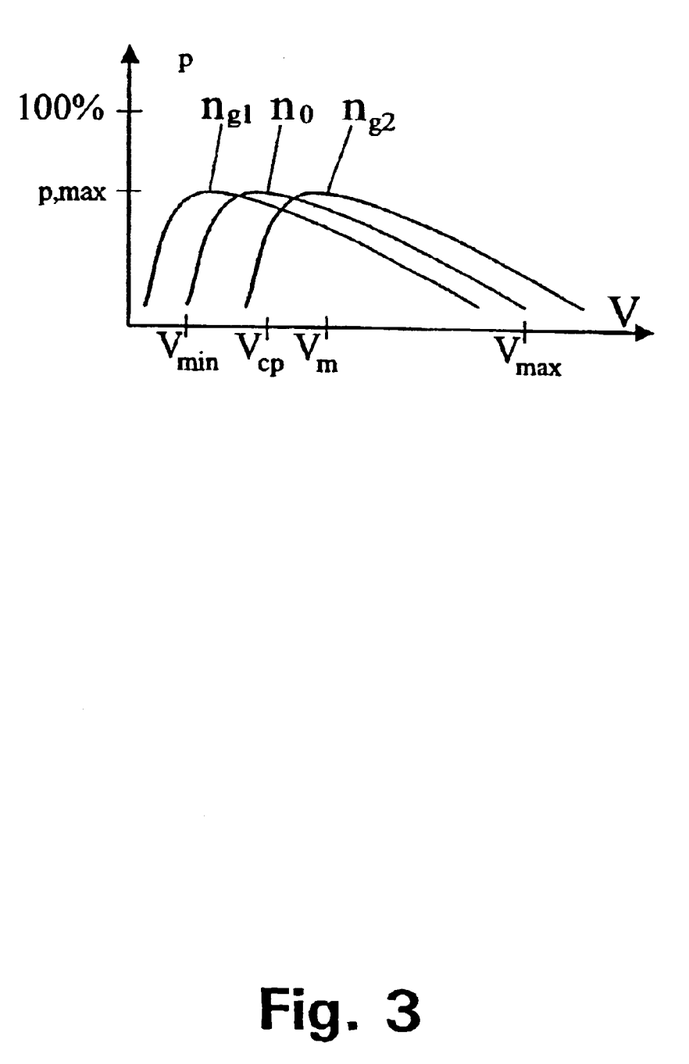
FIG. 3 shows $C_p$ as a function of the wind speed for different values of the rotational speed.

FIG. 3 shows the mechanical efficiency, $C_p$, as a function of the wind speed, v, as described above. Three curves are shown representing three different rotational speeds of the rotor, $n_{g1}$, $n_0$, and $n_{g2}$, where $n_{g1}$<$n_0$<$n_{g2}$. It is apparent from the figure that, given a certain wind speed, it is possible to choose the rotational speed of the rotor giving an optimum value of $C_p$, i.e. a value which is as close to $C_{p,max}$ as possible, preferably equal to $C_{p,max}$.

Figure 4:
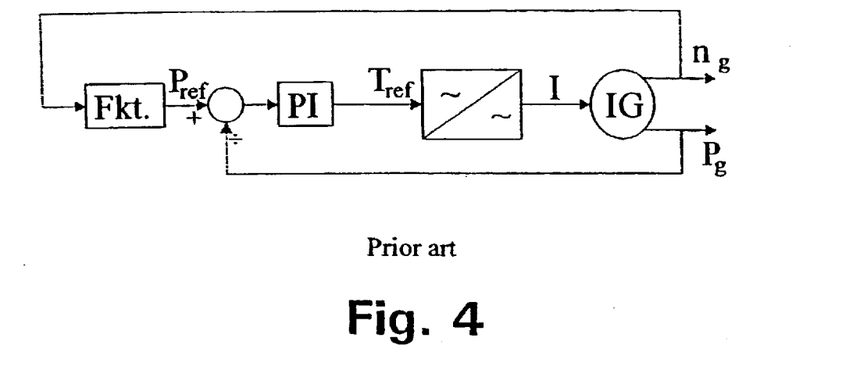
FIG. 4 is a schematic diagram of a control strategy which may be used to control a usual stall controlled wind turbine.

FIG. 4 shows a diagram describing a control strategy of a usual stall controlled variable speed wind turbine. The power currently being produced by the turbine, $P_g$, is measured. Then the difference between a reference power, $P_{ref}$, and $P_g$ is used as an input to a proportional integrator (PI) controller. The PI controller communicates a desired torque reference, $T_{ref}$, to a converter. The converter responds by sending a current signal through the generator of the turbine. $P_{ref}$ is determined on the basis of the rotational speed of the rotor, $n_g$, which may be obtained by measurement, by the "Fkt." block. This may be done in a number of different suitable ways as described below.

The most simple way of establishing a connection between $n_g$ and $P_{ref}$ is by assuming that $P_{ref}$ is proportional to $n_g$, when $n_{min}$<$n_g$<$n_0$, and that $P_{ref}$ is maintained at the nominal power when $n_g$ exceeds $n_0$, i.e.:

$$P_{ref} = \begin{cases} Kn_g; & n_{\min} < n_g < n_o \\ P_{nom}; & n_g > n_0 \end{cases}, \text{ where } K \text{ is a constant.}$$

where K is a constant.

This is a very simple strategy, and it is ensured that the nominal power of the turbine is not exceeded. However, it does not provide an optimal power production. It is therefore desirable to provide a strategy which considers this aspect and at the same time ensuring that the nominal power is not exceeded.

Notice that it is necessary to measure the wind speed in order to provide a suitable signal to the PI controller when this strategy is used. Since it is very difficult to measure the wind speed precisely, the control becomes accordingly inaccurate.

Figure 5:
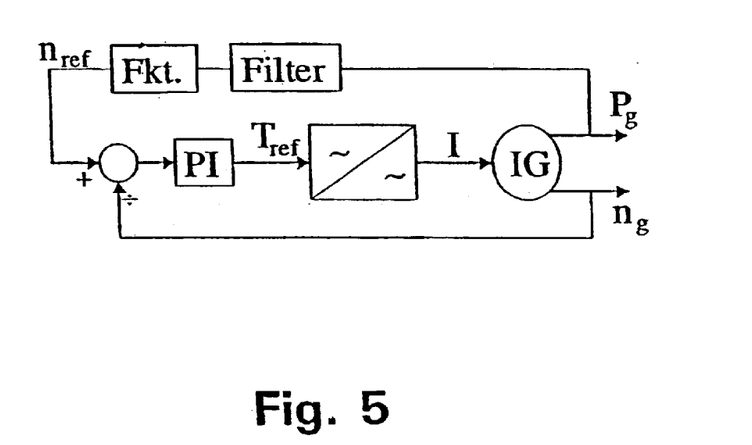
FIG. 5 is a diagram describing the control strategy of a wind turbine according to the invention.

FIG. 5 shows another diagram describing the control strategy of a variable speed wind turbine according to the invention. As compared to FIG. 4 the function of the "Fkt." block is "reversed", so that instead of measuring $n_g$, $P_g$ is measured. The measured value is then processed by the "Fkt." block in order to obtain a reference rotational speed, $n_{ref}$. Additionally, the actual rotational speed of the rotor, $n_g$, is measured, and the difference between $n_{ref}$ and $n_g$ is communicated to the PI controller. The PI controller then communicates a reference torque signal, $T_{ref}$, to the converter, which in turn sends a current signal to the generator of the turbine in order to control the speed of rotation of the rotor accordingly, so that a predetermined energy production is obtained. The predetermined energy production is preferably chosen in such a way that as much energy as possible is produced while still ensuring that a level, above which damage may be caused to the turbine, is not exceeded. It may, however also be chosen in such a way that only a limited energy production is obtained, e.g. because the power station only needs a limited production in a period of time.

The "Filter" block is added in order to ensure that the dynamics of $n_{ref}$ are appropriate as compared to the dynamics of the wind speed and the inertia of the rotor.

The PI controller, the filtering and/or the processing of $n_{ref}$ may be implemented into the controller of the turbine and/or directly into the converter. Preferably, the mentioned components are implemented into the converter, since this greatly reduces the amount of information which needs to be communicated between different components, and thus reduces the risk of erroneous communication.

Contrary to the control strategy described above in connection with FIG. 4, it is not necessary to measure the wind speed in order to provide an input to the PI controller when this strategy is used. Instead the power is measured, and since this can be done in a much more precise manner the control becomes accordingly more accurate.

FIG. 6 shows different curves related to the control strategy described above in connection with FIG. 5.

Figure 6A:
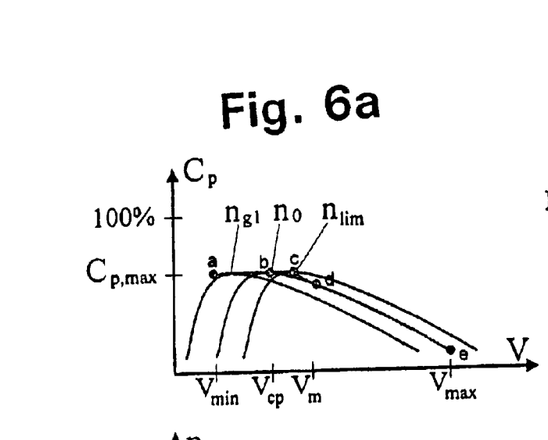
FIG. 6 shows curves describing the control strategy of a wind turbine according to the invention.

FIG. 6a. shows the three $C_p$ curves also shown in FIG. 3. Five points (a, b, c, d and e) are added indicating that different speeds of rotation are chosen for different wind speeds. At very low wind speeds close to $v_{min}$ the low speed of rotation, $n_{g1}$, is chosen (point a). At wind speeds close to $v_{cp}$ the nominal speed of rotation, $n_0$, is chosen (point b). At wind speeds exceeding $v_{cp}$ one may choose the higher speed of rotation, $n_{lim}$, as indicated by point c. However, in this case care must be taken that no damage is caused to the turbine. Therefore, for even higher wind speeds, $n_0$ is chosen instead (points d and e). When it is possible to choose the higher speed of rotation, $n_{lim}$, the energy production of the turbine is increased. This will be further described below in connection with FIG. 7.

Figure 6B:
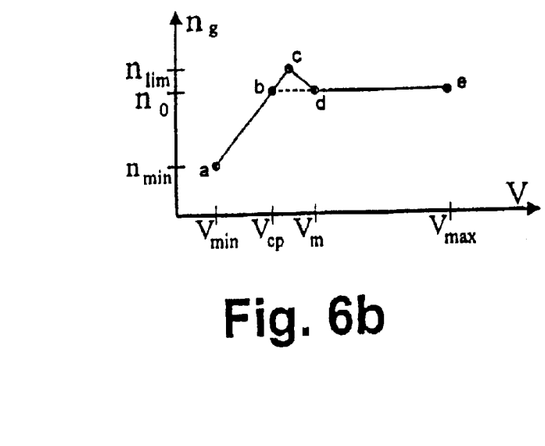
Figures 6C, 6D:
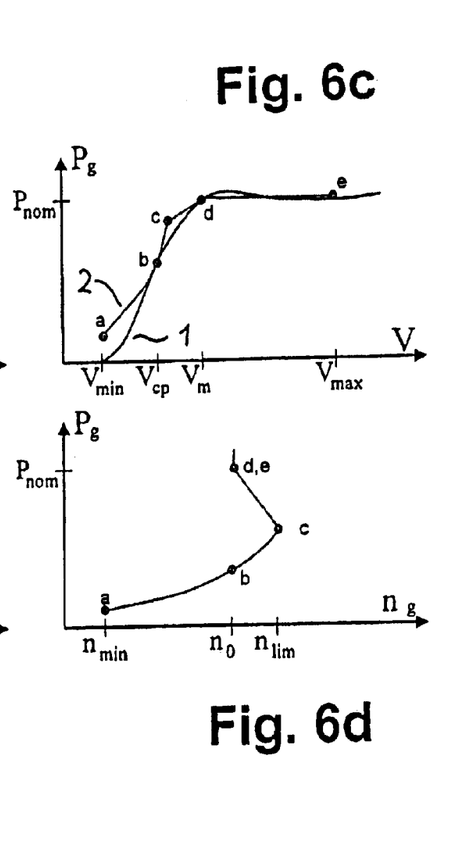

The choice of $n_0$ (or the choice of $n_{lim}$) is further illustrated in FIG. 6b, where n is plotted as a function of the wind speed, v. It is indicated that n might be kept constant at wind speeds exceeding $v_{cp}$ (points b, d and e). It is also indicated that the curve corresponding to $n_{lim}$ may advantageously be chosen for wind speeds exceeding $v_{cp}$ by a suitably small amount (point c).

In FIG. 6c it is even further illustrated. Curve 1 shows the produced power, P, as a function of the wind speed, v, when the turbine is operated only at $n_0$, and curve 2 shows the produced power, P, as a function of the wind speed, v, when the turbine is operated at different speeds of rotation as described above. Clearly, a higher power is obtained at low wind speeds (point a). At wind speeds exceeding $v_{cp}$ the produced power is substantially the same for the two strategies at points b, d and e. This is not surprising considering that the in both cases the nominal speed of rotation, $n_0$, is chosen. However, it is clear that at point c (corresponding to the choice of $n_{lim}$ instead of $n_0$) a higher power is produced when the strategy according to the invention is used than when the strategy of fixed speed is used.

FIG. 6d shows the produced power, P, as a function of the speed of rotation, n. The connection is established using the curves of FIGS. 6a, 6b and 6c. As it is readily seen an infinite number of power values correspond to the nominal speed of rotation, $n_0$ (points b, d and e). This is due to the fact that $n_0$ is always chosen whenever the wind speed exceeds a certain value. Therefore P can not be unambiguously determined at a given n. This condition makes it less advantageous to choose a control strategy, wherein n is measured and P is derived from n as illustrated in the diagram of FIG. 4. However, as can be seen from FIG. 6d, n may always be unambiguously determined for a given value of P. It is therefore advantageous to choose a control strategy, in which P is measured and n is derived from the measured P. This is exactly the control strategy which is illustrated in the diagram of FIG. 5. Notice that the wind speed is not a parameter to be measured when this strategy is used.

By choosing the "right" rotational speed at a given wind speed the structural loads on the turbine, especially to the rotor of the turbine, is reduced.

FIG. 7a shows the mechanical power, P, produced by the turbine as a function of the rotational speed of the rotor, n. The unit of the axis of the rotational speed is "fraction of the nominal rotational speed $n_0$". The marked points indicate rotational speeds corresponding to the rotational speed of the generator from 500 rpm to 1700 rpm in steps of 200 rpm.

The "present Pn" line indicates a control strategy in which the rotational speed is simply kept constant, when the rotational speed reaches $n_0$.

The remaining lines indicate control strategies where the rotational speed is allowed to exceed the level corresponding to $n_0$. Empirical tests show that operation of the turbine at rotational speeds exceeding $n_0$ by a suitably small amount (such as at n≈1.2·$n_0$) will not cause damage to the turbine at wind speeds corresponding to said rotational speed, although the level corresponding to $n_0$ is exceeded. Thus, it will not cause damage to the turbine to continue along the solid line beyond the level corresponding to $n_0$ until n≈1.2·$n_0$ as indicated in the figure. At higher wind speeds one of the three "design" lines should be followed until a mechanical power of approximately 500 kW is reached. It is clear that a higher power is produced when one of these strategies is chosen. The amount of additionally produced power depends on which design is chosen, the amount increasing as the chosen maximum value of n increases.

Thus, it is possible to operate the rotor of the turbine at rotational speeds which exceed the level corresponding to $n_0$ although this level was previously believed to define the limit for operation of the turbine. At the same time it is ensured that the turbine is not damaged. This way the energy production of the turbine is increased.

Figure 7B:
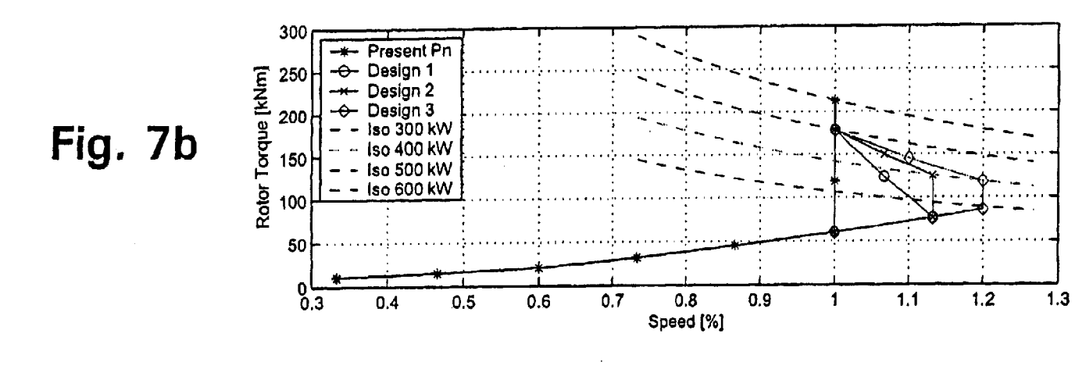
FIG. 7b shows the rotor torque of a wind turbine as a function of the rotational speed of the rotor for different designs.

FIG. 7b shows the rotor torque of a wind turbine as a function of the rotational speed of the rotor for different designs. It is very similar to FIG. 7a. However, it indicates that the rotor torque may be measured instead of the mechanical power and used as an input for the processing step. The dashed lines indicate power levels corresponding to the different designs.

The curves of FIGS. 7a and 7b might very well be used to establish a connection between $P_g$ (or M) and $n_{ref}$, i.e. it might be used by the "Fkt." block of FIG. 5. In this case it is an object for the PI controller of FIG. 5 to provide an output which, via the converter, causes the speed of rotation of the rotor to be adjusted.

Figure 8:
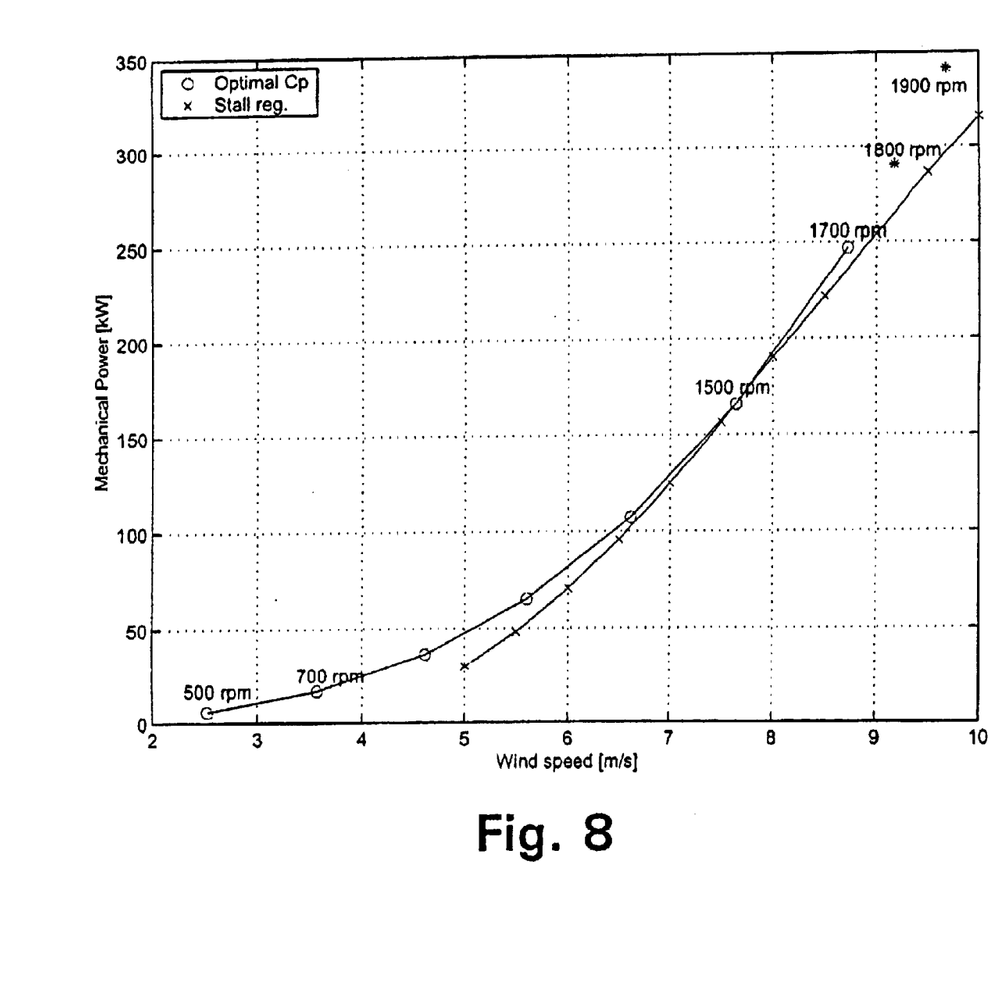
FIG. 8 shows the mechanical power as a function of the wind speed for a stall controlled wind turbine and the same wind turbine being controlled according to the invention, respectively.

FIG. 8 shows the mechanical power as a function of the wind speed for a fixed speed stall controlled wind turbine (crosses) and a variable speed wind turbine according to the invention (open dots), respectively. The open dots indicate a wind turbine which is controlled according to the optimal $C_p$ strategy. The optimal $C_p$ control strategy is a strategy in which the speed of rotation of the rotor is controlled in such a way that the $C_p$ of the turbine is as large as possible, as described above.

It is clear from the figure that the mechanical power, and hence the energy production, is higher for the turbine controlled according to maximum $C_p$ strategy than for the turbine controlled according to the conventional stall control strategy. It is also clear that the difference increases as the wind speed increases for wind speeds exceeding v≈7.7 m/s. It is therefore an advantage to be able to operate the turbine according to the maximum $C_p$ strategy at as high wind speeds as possible. The stars indicates calculations at even higher wind speeds. It is clear that the difference keeps increasing. At even higher rotational speeds the increase will be even higher, thus making it more advantageous to use the maximum $C_p$ strategy the higher a rotational speed may be chosen. However, it is still necessary to ensure that no damage is caused to the turbine, even if a wind gust having a wind speed which exceeds the average wind speed considerably occurs.

Figure 9:
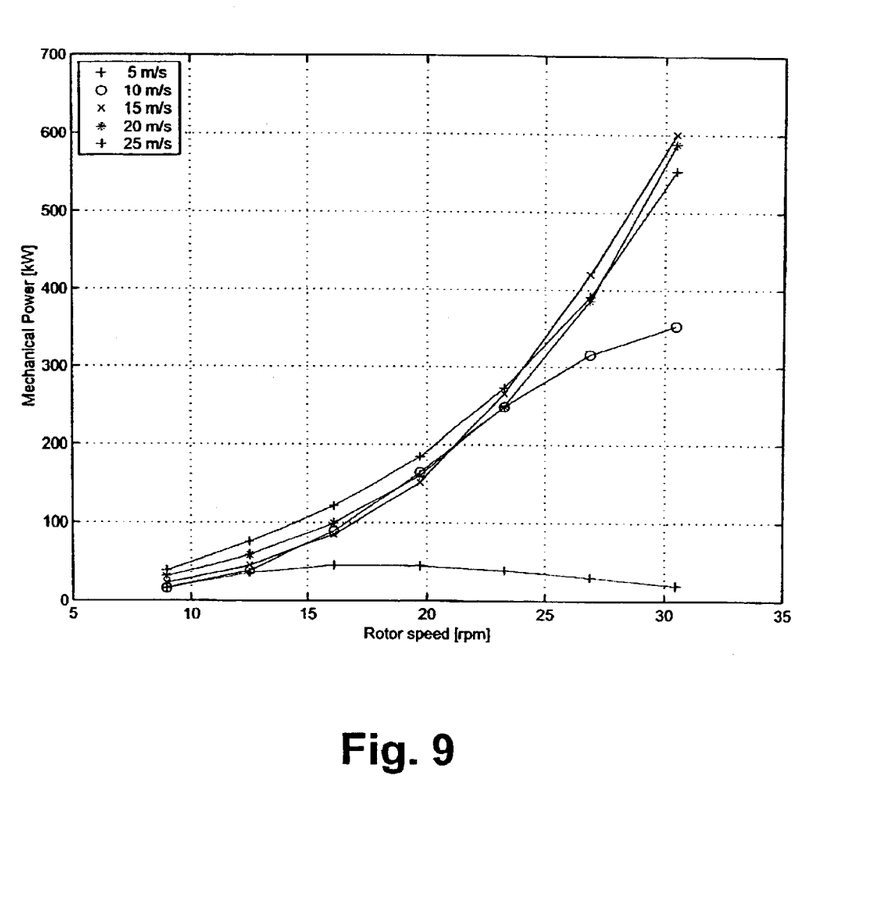
FIG. 9 shows the mechanical power of a wind turbine as a function of the rotational speed of the rotor at different average wind speeds.

FIG. 9 shows the mechanical power of a wind turbine as a function of the rotational speed of the rotor at average wind speeds of 5 m/s, 10 m/s, 15 m/s, 20 m/s and 25 m/s, respectively. It is clear from the figure that the mechanical power for low average wind speeds (5 m/s and, to a certain extend, 10 m/s) is very low as compared to the mechanical power for higher average wind speeds, given a certain rotor speed. It is also clear that for an average wind speed of 5 m/s the optimal rotational speed of the rotor is about 18 rpm, whereas for average wind speeds of 10 m/s and higher, the optimal rotational speed is the nominal rotational speed.

Park Solutions

In the following, referring to FIGS. 10 and 11, solutions involving a plurality of wind turbines, e.g. wind turbines of a wind farm, will be described.

Wind power installations with blade angle control and/or power converters are able to control the active power supply to a power system. Moreover, wind power installations with power converters are able to control the reactive power supply to the power system. The active power regulations in these wind power installations normally serve to obtain maximum production, and limit the power only to avoid overloading and stress of the wind turbine components, whereas the reactive power regulation serves to obtain a constant, high power factor, e.g. unity.

Other types of actively controlling power plants in the power system contribute to the frequency control by regulation of the active power, and to the voltage control by regulation of the reactive power. Such control capabilities can also be obtained in wind power installations with power converters, but it has only been practised in a few cases. The main reason for this caution is that the impact on the stability of the power system becomes a concern, when thousands of wind turbines independently regulate the voltage on the local terminals.

For power systems with high penetration of wind energy, the ability of the wind power installations to contribute to the regulation of the voltage and frequency of the power system becomes an important issue, because it strongly influences the ability of the wind power installations to replace other power plants. Thus, both the capacity credit of the wind power installation and the fuel savings on other power plants are influenced by the control capabilities of the wind power installations.

To provide the wind power installations with power system control capabilities and to improve the influence on the power system stability, central power electronic units in large wind farms are a promising technical solution. Central units can be connected to the power system in the wind farm connection point, and consequently can contribute to the control of the voltage and frequency in that point. In that respect, wind farms with central power electronic units can act more like a power plant. Also, central units are likely to be the most cost efficient way to provide control capabilities to large wind farms.

Reactive Power Compensation Units

Reactive power compensation units are widely used in power systems to provide the reactive power balance and improve the voltage stability. The compensation units are used to supply both inductive and capacitive power. Typically, capacitive power is supplied to compensate for reactive loads while inductive power is supplied to compensate for capacitive consumption in cables.

The most used units to compensate for reactive power in the power systems are either synchronous condensers or shunt capacitors, the latter either with mechanical switches or with thyristor switches like in Static Var Compensators (SVC). The disadvantage of using shunt capacitors is that the reactive power is proportional to the square of the voltage, and consequently the reactive power from the capacitors decreases rapidly when the voltage decreases, and the reactive power is needed to maintain voltage stability.

STATCOMs or ASVCs are basically inverters based on forced-commutated switches, i.e. with full, continuous control of the reactive power. The maximum available reactive power from a STATCOM is proportional to the voltage, and consequently the maximum reactive power decreases much slower for STATCOMs than SVCs when the voltage decreases.

The transmission system operator ELTRA in the western half of Denmark has installed a 2×4 MVA ASVC on the 24 MW wind farm in Rejsby Hede to demonstrate and test this concept. The Rejsby Hede wind farm consists of forty 600 kW NEG-Micon wind turbines with directly connected induction generators. The no-load consumption of reactive power in the induction generators is compensated by shunt capacitors on the 700 V level in the individual wind turbines.

The ASVC in Rejsby Hede compensates for the load-dependent reactive power consumption in the wind farm by a fast, continuous reactive power regulation in the wind farm connection point. Thus, the ASVC runs in the power factor control mode, i.e. controls the power factor to unity in the wind farm connection point.

The ASVC can in principle also run in a voltage regulation mode, i.e. participate in the voltage regulation on the grid. However, the grid is very strong in the wind farm connection point of the Rejsby Hede wind farm. Therefore, the ASVC has not been designed to participate in the voltage regulation, and also not tested in that mode.

Power Regulation and Storage Units

The normal power regulation of a wind turbine is the combination of optimisation and limitation of the power to protect the wind turbine. More overall wind farm regulation of the power to meet the requirements of the grid is not so common, but some examples of voltage dependent power regulation are known. In Cronalaght wind farm in Ireland, the blade angle control is used to limit the power, and in Bockstigen wind farm in Sweden, dump loads and disconnection of wind turbines are used.

When wind energy penetration in the power system becomes high, the use of storage units becomes interesting, because the limitation of power required by the power system can lead to substantial loss of potential energy from the wind turbines. At the same time, storage units can ensure power from the wind farm even if the wind speed is low. Consequently, storage units can provide large wind farms with power regulation capabilities, which can enable wind farms to replace, and not just supplement, other power plants. Besides a capacity reduction of other power plants, such regulation capabilities can further reduce the requirement for spinning reserve and thus reduce the total fuel costs in the power system. Therefore, the development of storage technologies is very important for the development of wind energy.

When the natural resources are available, pumped storage can be competitive to grid reinforcement today. However, in many places, pumped storage is not an option.

Therefore, the development of batteries, fuel cells and other storage technologies is very important. The main drawback of batteries today is the relatively high cost. An additional cost item for battery storage systems is the conversion from the AC grid to a DC. That cost can be avoided if the batteries are connected to an existing DC voltage, e.g. the DC link in an ASVC or a High Voltage Direct Current (HVDC) transmission.

HVDC

Figure 10:
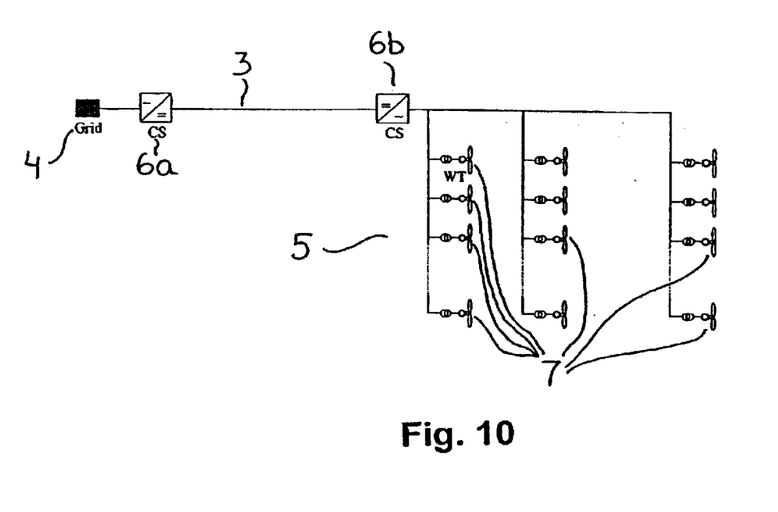
FIG. 10 shows a High Voltage Direct Current (HVDC) configuration for connection of a wind farm in which the HVDC link is connected to the power system in one end and to the wind farm AC grid in the other end.

Referring now to FIG. 10, one of the most discussed concepts for grid connection of large (offshore) wind farms is HVDC. This is due to a combination of the rapid development of this technology and the advantages that the technology can give for system operation as well as wind turbine operation.

A HVDC link comprises a minimum of two AC/DC converter stations 6 and a DC cable 3 to link the stations 6. The latest semiconductor technology development combined with advanced control of series connected semiconductors has provided modern HVDC transmission systems like ABB's HVDC Light with full controllable converters based on forced commuted semiconductors.

HVDC technologies are mainly interesting for transmission over longer distances. The DC cable is less expensive than an AC transmission cable with the same capacity, but the costs of the converter stations makes the complete HVDC link more expensive than the corresponding AC link, if the transmission distance is below a certain threshold. Still, the threshold distance decreases rapidly with the technology development of power electronics, which reduces the costs for the converter stations.

For offshore applications, HVDC links can also be viable when the critical cable length for AC transmission is reached. In that case, a compensation unit is required on the AC transmission, which is also very costly for offshore transmission.

The worlds first HVDC Light installation is today operating on Gotland. It was installed to increase the transmission capacity from the many wind turbines installed in the south of the island to the consumers in the town in the north of the island. At the same time, it serves to feed reactive power into the AC grid, particularly to the wind turbines in the south, and to ensure the voltage stability. ELTRA has also installed a HVDC Light connection in Tjæreborg, Denmark, to test the use of it for large wind turbines.

Because of the advantages to the power system, HVDC Light will probably be installed for transmission of power from a number of large wind farms over long distances, both offshore and on land. This will open up new possibilities for variable speed control of wind turbines, because the frequency (or frequencies) of the grid(s) at the wind turbines can be controlled independently on the power system frequency.

The simplest HVDC Light configuration for connection of a wind farm is the group connection shown in FIG. 10. The HVDC link 3 is connected to the power system 4 in one end and to the wind farm AC grid 5 in the other end. At each end there is positioned an AC/DC converter station 6a, 6b. All of the wind turbines 7 are connected to one AC/DC converter station 6b. The converter station 6b converts the AC power received from the turbines 7 into a DC power which is in turn transported via the HVDC connection 3 to the other AC/DC converter station 6a. AC/DC converter station 6a converts the received DC power into an AC power which is supplied to the power system 4.

In principle, all wind turbines 7 designed for connection to AC grid can be connected to the wind farm AC grid 5 in FIG. 10, but many of the advantages in using power converters 6 in the wind turbines 7 are reduced. It is therefore most obvious to use wind turbines 7 with directly connected induction generators. With such a concept, the converter 6b at the wind farm will supply the wind turbines 7 with reactive power, and that way make the wind farm grid 5 more robust toward grid faults.

HVDC connection also makes it possible to control the frequency of the wind farm grid 5 in order to improve the aerodynamic efficiency like for wind turbines 7 with individual power converters. The frequency control must however set the frequency as a compromise between the optimal frequency for all the individual wind turbines 7 in the wind farm, because the wind speed and consequently the optimal frequency is different from wind turbine to wind turbine. Therefore, the aerodynamic efficiency is reduced slightly compared to wind turbines with individual power converters.

Another aspect of the group connection concept is that the common frequency control can not be used to reduce the mechanical loads on the drive train like individual power converters in the wind turbines 7 can do. This is important for stall controlled wind turbines, and for pitch controlled wind turbines it is necessary to have additional speed control of the individual wind turbine like e.g. optislip.

Figure 11:
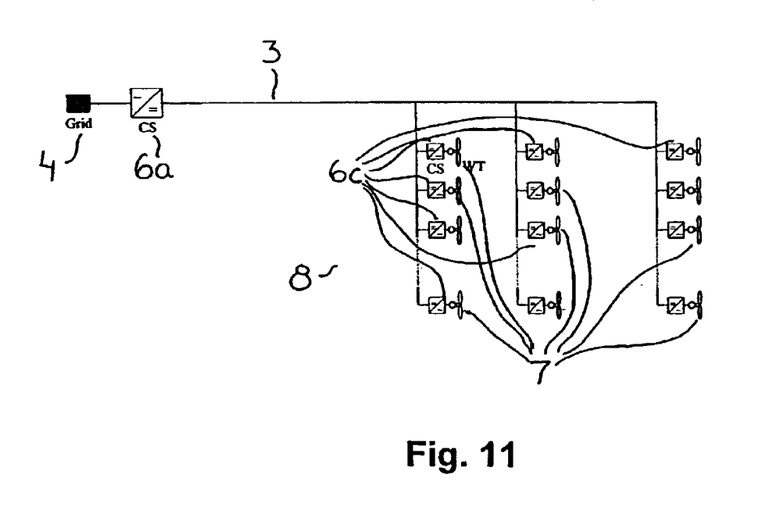
FIG. 11 shows a High Voltage Direct Current (HVDC) configuration for connection of a wind farm in which the wind turbines are supplied with their own AC/DC converter.

Referring now to FIG. 11, another configuration, which appears to have all the technical advantages of wind turbines 7 with individual power converters is shown in FIG. 11. The wind turbines 7 are supplied with their own AC/DC converter 6c.

If the AC/DC converters 6c in the individual wind turbines 7 are based on forced-commutated semiconductors, the frequency and consequently the speed of the wind turbines 7 can be controlled individually. In that case, the frequency control can be used to reduce the mechanical loads on the drive train, effectively using the rotor inertia to absorb the fastest fluctuations in the aero loads.

The individual AC/DC converters 6c convert the AC power received from the turbine 7 in question into a DC power. Since each turbine 7 is provided with an AC/DC converter 6c the turbines 7 are thus connected in a DC grid 8. The DC grid 8 is connected to a second AC/DC converter station 6a via a HVDC connection 3. The second AC/DC converter station 6a converts the received DC power into an AC power which is supplied to the power system 4 as described above.

A windformer concept with individual AC/DC converters 6c as shown in FIG. 11 is proposed. The windformer concept removes the ability to use the frequency control to reduce the mechanical loads on the drive trains, because the speed control is based on control of the DC voltage at the converter 6a in the power system connection point, which is common for all the wind turbines 7. The mechanical drive train loads are, however, not so critical for the windformer concept, because the wind turbines are preferably gearless.

Thus, a method of operating a turbine is provided which provides an increased energy production as compared to existing turbines. The method further ensures that an optimal energy production is achieved at any wind speed, yet it is still taken care that no damage is caused to the turbine. Additionally, since it is not necessary to measure the wind speed, a method is provided in which the operation parameters are readily and easily obtained, i.e. it is not necessary to measure the wind speed. Further, a method is provided in which the structural loads on the turbine are reduced. Even further, a method of operating a plurality of turbines has been provided which optimises the energy production while still maintaining control of the turbines.

What is claimed is:

1. A method of controlling the speed of rotation of a turbine, the turbine comprising a rotor, the method comprising the steps of measuring or estimating power or torque related to the energy production of the turbine, processing the measured or estimated power or torque so as to obtain a corresponding rotational speed, comparing the obtained rotational speed to a first predefined threshold value and to a second predefined threshold value, the second predefined threshold value being larger than the first predefined threshold value, and controlling the speed of rotation of the rotor according to the obtained rotational speed, so as to obtain a predetermined energy production from the turbine, and in such a way that in case the obtained rotational speed does not exceed the first predefined threshold value, the predetermined energy production from the turbine is optimal, in case the obtained rotational speed exceeds the first predefined threshold value, but does not exceed the second predefined threshold value, the predetermined energy production from the turbine is optimal, in case the obtained rotational speed exceeds the second predefined threshold value, the speed of rotation of the rotor of the turbine is reduced in a predefined manner to a value corresponding to the first predefined threshold value.

2. A method according to claim 1 wherein the turbine is a wind turbine.

3. A method according to claim 1, wherein the processing step is performed electronically.

4. A method according to claim 1, wherein, in case the predetermined energy production from the turbine is optimal, the turbine is operated in such a way that the instantaneous $C_p$ for the turbine is as close as possible or equal to the maximum $C_p$.

5. A method according to claim 1, wherein the processing is based on a predetermined set of data being values of pre-selected $C_p$'s and corresponding rotational speeds.

6. A method according to claim 5, the turbine being a wind turbine, wherein the pre-selected $C_p$'s are the maximum $C_p$'s obtained during stationary rational conditions of the wind turbine at varying wind speeds.

7. A method according to claim 1, further comprising the step of initially determining curves of mechanical power and/or $C_p$ for the turbine rotor at different rotational speeds.

8. A method according to claim 7, the turbine being a wind turbine, wherein the step of processing the measured or estimated power or torque includes the steps of for each rotational speed determining the wind speed which gives $C_{p,max}$, and determining the mechanical and/or electrical power corresponding to said wind speed.

9. A method according to claim 7, the turbine being a wind turbine, wherein the step of processing the measured or estimated power or torque includes the steps of subsequently determining curves of mechanical power and/or $C_p$ for the turbine rotor at different rotational speeds, for each rotational speed determining the wind speed which gives $C_{p,max}$, and determining the mechanical and/or electrical power corresponding to said wind speed.

10. A method according to claim 7, wherein the wind speeds giving $C_{p,max}$ for each rotational speed are predetermined from pre-recorded or theoretical data.

11. A method according to claim 1, wherein the first predefined threshold value corresponds to a nominal or a pseudo-nominal rotational speed of the rotor of the turbine, and wherein the second predefined threshold value corresponds to an upper limit of the rotor of the turbine.

12. A method according to claim 1, wherein the speed of rotation of the rotor of the turbine, in case the obtained rotational speed exceeds the second predefined threshold value, is reduced by:

maintaining the speed of rotation on a value corresponding to the second predefined threshold value, while the energy production of the turbine increases until it reaches an energy threshold value, and subsequently reducing the speed of rotation to a value corresponding to the first predefined threshold value in case the energy production continues to increase.

13. A method according to claim 1, wherein the speed of rotation of the rotor of the turbine, in case the obtained rotational speed exceeds the second predefined threshold value, is reduced by:

reducing the speed of rotation linearly with respect to the energy production of the turbine until a predefined energy production as well as the speed of rotation corresponding to the first predefined threshold value is obtained.

14. A method according to claim 1, further comprising the step of measuring the speed of rotation of the rotor.

15. A method according to claim 14, further comprising the steps of
- comparing the measured speed of rotation of the rotor and the rotational speed obtained by processing the measured or estimated power or torque,
- producing a signal being significant for said comparison, and
- controlling the speed of rotation of the rotor according to said signal.

16. A method according to claim 14, wherein the produced signal indicates the difference between the measured speed of rotation and the rotational speed obtained by processing the measured or estimated power or torque.

17. A method according to claim 1, the turbine being a wind turbine, the method further comprising the step of adjusting the power generated by the turbine by adjusting the pitch angle of the turbine.

18. A turbine comprising
- a rotor,
- a generator,
- means for measuring or estimating power or torque related to the energy production of the turbine,
- processing means for processing the power or torque measured or estimated by the measuring or estimating means, so as to obtain a corresponding rotational speed,
- comparing means for comparing the obtained rotational speed to a first predefined threshold value and to a second predefined threshold value, the second predefined threshold value being larger than the first predefined threshold value, and
- control means for controlling the speed of rotation of the rotor according to the obtained rotational speed, the control means being adapted to control the speed of rotation in such a way that a predetermined energy production is obtained from the turbine, and in such a way that
  - in case the obtained rotational speed does not exceed the first predefined threshold value, the predetermined energy production from the turbine is optimal,
  - in case the obtained rotational speed exceeds the first predefined threshold value, but does not exceed the second predefined threshold value, the predetermined energy production from the turbine is optimal,
  - in case the obtained rotational speed exceeds the second predefined threshold value, the speed of rotation of the rotor of the turbine is reduced in a predefined manner to a value corresponding to the first predefined threshold value.

19. A turbine according to claim 18, wherein the turbine is a wind turbine.

20. A turbine according to claim 18, wherein the processing means is electronically processing means.

21. A turbine according to claim 19, further comprising means for determining curves of mechanical power and/or $C_p$ for the turbine.

22. A turbine according to claim 20, further comprising
- means for determining, for each rotational speed, the wind speed which gives $C_{p,max}$, and
- means for determining the mechanical and/or electrical power corresponding to said wind speed.

23. A turbine according to claim 21, wherein the means for determining wind speed comprises tables containing pre-recorded or theoretical data.

24. A turbine according to claim 21, wherein the means for determining wind speed comprises curves of pre-recorded or theoretical data.

25. A turbine according to claim 18, further comprising means for measuring the speed of rotation of the rotor.

26. A turbine according to claim 25, further comprising means for comparing the measured speed of rotation and the rotational speed obtained by processing the measured or estimated power or momentum.

27. A turbine according to claim 26, wherein the control means comprises means for receiving a signal, said signal being produced by the means for comparing the measured speed of rotation and the obtained rotational speed, and wherein the control means controls the speed of rotation of the rotor according to said signal.

28. A turbine according to claim 19, wherein the turbine is a gear-less wind turbine.

29. A turbine according to claim 18, further comprising means for, in case the obtained rotational speed exceeds the second predefined threshold value, reducing the speed of rotation of the rotor of the turbine, the reducing means being adapted to
- maintain the speed of rotation on a value corresponding to the second predefined threshold value, while the energy production of the turbine increases until it reaches an energy threshold value, and
- subsequently reduce the speed of rotation to a value corresponding to the first predefined threshold value in case the energy production continues to increase.

30. A turbine according to claim 18, further comprising means for, in case the obtained rotational speed exceeds the second predefined threshold value, reducing the speed of rotation of the rotor of the turbine, the reducing means being adapted to
- reduce the speed of rotation linearly with respect to the energy production of the turbine until a predefined energy production as well as the speed of rotation corresponding to the first predefined threshold value is obtained.

* * * * *